United States Patent [19]

Klak

[11] Patent Number: 5,305,796

[45] Date of Patent: Apr. 26, 1994

[54] APPARATUS AND METHOD FOR CENTERING AN ORIFICE PLATE

[75] Inventor: Steven P. Klak, Houston, Tex.

[73] Assignee: G-H Flow Automation, Inc., Houston, Tex.

[21] Appl. No.: 925,969

[22] Filed: Aug. 5, 1992

[51] Int. Cl.[5] ................................................. F15D 1/02

[52] U.S. Cl. ...................................... 138/44; 138/40; 138/45

[58] Field of Search .................... 138/44, 40, 94.3, 37, 138/94, 45; 277/71-74, 27; 251/175, 182, 193

[56] References Cited

U.S. PATENT DOCUMENTS

| | | | |
|---|---|---|---|
| 3,817,287 | 6/1974 | Aitken | 138/44 |
| 4,014,366 | 3/1977 | Critendon | 138/44 |
| 4,191,216 | 3/1980 | Connolly | 138/44 |
| 4,286,364 | 9/1981 | Connolly | 29/157.1 R |
| 4,422,339 | 12/1983 | Gall et al. | 73/861.61 |
| 4,444,224 | 4/1984 | Geisow | 138/44 |
| 4,478,251 | 10/1984 | Sanchez et al. | 138/44 |
| 4,503,594 | 3/1985 | Gall et al. | 29/157 R |
| 4,593,915 | 6/1986 | Seger et al. | 227/12 |
| 4,633,911 | 1/1987 | Lohn | 138/44 |
| 4,750,524 | 6/1988 | Sekoguchi et al. | 138/45 |
| 5,042,531 | 8/1991 | Foster et al. | 138/44 |
| 5,050,842 | 9/1991 | Foster et al. | 176/251 |
| 5,085,250 | 2/1992 | Kendrick | 138/44 |
| 5,094,272 | 3/1992 | Foster et al. | 138/44 |

OTHER PUBLICATIONS

Superior Measurement Equipment-"Superior Dual Chamber Orifice Fitting," 1990, all.
Daniel Industries, Inc.-Senior ® Orifice Fitting Technical Manual, 1991, all.
Perry Equipment Corp.-"Peco Orifice Fittings Comply with API 14.3", Jan. 1992, all.
Perry Equipment Corp.-"Measuremaster ® Dual Chamber Orifice Fittings," Feb. 1988, all.
Daniel Industries, Inc.-"Senior Orifice Fittings," pp. 1-6, 26.
American Petroleum Institute-"Orifice Metering of Natural Gas and Other Related Hydrocarbon Fluids", p. 10.
American Petroleum Institute-Manual of Petroleum Measurement Standards, Chapter 14-Natural Gas Fluids Measurement, Feb. 1991, pp. 15-17.
Perry Equipment Corp. (Peco)-"The Reps Reporter," Apr. 1992, p. 1.
Michael B. Johnson-"Effect of 1991 Revision of ANSI 2530 on Orifice Meter Run," pp. 174-176.
Daniel Flow Products, Inc.-"API-AGA 14.3 Update," p. 1.
Daniel Flow Products, Inc.-"What do you need to know to be sure your orifice fitting 'meets 14.3' without added uncertainty or beta limitations?", p. 10.
Daniel Flow Products, Inc.-"News about Daniel Orifice Fittings" brochure, pp. 1-2.
Loy Upp-"EGA Report #3 Changes-New Specifications for Hardware," Apr. 14-15, 1992, pp. 1-8.

Primary Examiner—Harvey C. Hornsby
Assistant Examiner—Patrick F. Brinson
Attorney, Agent, or Firm—Vinson & Elkins

[57] ABSTRACT

An orifice fitting with an orifice plate centered in the flow passage of an orifice fitting via direct contact between a cradle and the orifice plate. The orifice plate is centered via the use of an orifice plate carrier having two channels on its downstream side and two slots located in the bottom portion of the seat, which is located on the plate carrier's upstream side. The plate fits into the seat and a bottom portion of the plate's peripheral edge protrudes through the slots. A cradle having locating surfaces fits through the channels in the orifice plate carrier and firmly holds the orifice plate against the orifice plate carrier. The cradle can be positioned and then secured in place by two adjustable set screws and a stem piece of the cradle. Once the orifice plate has been centered via the positioning of the cradle, the stem piece of the cradle and the set screws can be welded into the body of the orifice fitting. Alternatively, the cradle may be formed from weld metal added to the body of the orifice fitting and machined to define the cradle, or can be machined from a portion of the cast metal cradle. The method of the present invention involves the use of a cradle having locating surfaces to center an orifice plate in an orifice fitting by inserting the locating surfaces of the cradle in channels in an orifice plate carrier so that the locating surfaces contact and hold a bottom portion of the peripheral edge of the orifice plate and then positioning the cradle so as to center the plate.

22 Claims, 5 Drawing Sheets

APPARATUS AND METHOD FOR CENTERING AN ORIFICE PLATE

FIELD OF THE INVENTION

This invention relates in general to orifice fitting equipment for measuring fluid flow in pipelines, and in particular to an apparatus and method for centering an orifice plate in an orifice fitting.

BACKGROUND OF THE INVENTION

Orifice fitting devices are useful in measuring the flow of fluids in pipelines. An orifice fitting commonly includes, among other things, an orifice plate, which has a restricted bore. As is well known, where a fluid flows through a restricted orifice in a pipeline, a pressure differential is developed across the upstream and downstream sides of the orifice. This pressure differential can be detected and measured. Indeed, the pressure differential, together with other factors such as pressure, type of fluid, temperature and so forth, can be used to calculate the amount of the fluid which flows through pipeline during the given time period.

As is well known, orifice fittings can be used to measure, among other things, the flow of natural gas through gas pipelines. In fact, orifice fittings are used as the primary method of measuring natural gas as it flows through pipelines throughout the world. Orifice fittings of a type heretofore used in natural gas pipelines include a square orifice plate carrier that has a recess in it that accepts an orifice plate and a seal. In a dual-chambered orifice fitting, the plate carrier assembly (i.e., the combination of the orifice plate carrier, the orifice plate, and a seal), can be lowered into or removed from its position in the flow passage of the orifice fitting by an operator. The plate carrier assembly's position within the fitting (and more specifically, within the flow passage of the fitting) of this type of orifice fitting is held by three fixed-in-place screws. An operator typically centers the plate carrier assembly in the vertical direction by adjusting one of the three screws and then adjusting the other two screws for horizontal centering. This is done by a trial and error method where the operator puts the carrier assembly in the fitting, adjusts the screws, takes a measurement, and then readjusts the screws. This process is typically repeated until the orifice plate's bore is centered within the flow passage of the orifice fitting.

A variety of orifice fittings, orifice plates, and orifice plate carriers have been suggested over the years. Typical prior art orifice fittings, orifice plates and orifice plate carriers, as well as other devices, are those shown in U.S. Pat. Nos. 3,817,287, 4,444,224, 4,478,251, 4,593,915, 4,633,911, 4,750,524, 5,042,531, 5,094,272, and the 1990 brochure entitled "Superior Dual Chamber Orifice Fitting," published by Superior Measurement Equipment of Houston, Tex., all of which are incorporated herein by reference.

U.S. Pat. No. 3,817,287 describes an orifice fitting with a saddle for receiving an orifice plate and seal and allows installation and removal of orifice plates without the necessity of depressurizing the line to which the orifice fitting is attached. U.S. Pat. No. 4,444,224 describes another orifice plate mechanism that allows installation and removal of orifice plates without the necessity of depressurizing the line to which the orifice fitting is attached. This patent also describes the use of an ejector plate, which supports the orifice plate between gear operated seat members. The gear operated seat members hold the orifice plate in place in the flow passage during operation of the orifice fitting; the orifice plate is inserted, held in place and removed via a relatively complicated system of gears and cams and requires the use of a specially designed orifice plate. U.S. Pat. No. 4,478,251 describes orifice plates and specifically, an orifice fitting seal assembly comprising internal seal rings, an external locking ring, an outer pair of O-ring sealing elements, and an inner pair of O-ring sealing elements. U.S. Pat. No. 4,593,915 describes an orifice plate seal ring for use in an orifice fitting, comprising two seal rings composed of sufficiently hard material as to resist swelling or distortion under high pressures and/or high temperatures. U.S. Pat. No. 4,633,911 describes an orifice plate seal ring having a U-cup spring located within circumferential grooves in the seal ring, where the seal ring completely encases the outer circumference of the orifice plate. U.S. Pat. No. 4,750,524 describes an apparatus for changing orifice plates in orifice fittings, but requires a specially designed rectangular parallelepipedal orifice plate. U.S. Pat. No. 5,042,531 describes an energized seal for use in orifice fitting wherein a hollow pin containing a piston mounted on the orifice plate carrier is used to energize the seal. U.S. Pat. No. 5,094,272 describes an orifice plate seal which can be adjusted to allow the desired amount of interference fit between the orifice plate carrier and the seat slot.

Large commercial transactions, such as sales of natural gas, are based on the data generated by measurements made with the use of orifice fittings. Because of this, orifice fittings generally and, more particularly, orifice plates, have been studied in detail. To bring uniformity and accuracy to such measurements, various organizations have promulgated written standards dealing with orifice plates.

Industry standards require "concentricity"; i.e., they require that the center of the orifice plate's bore and the center of the flow passage (as defined by the upstream and downstream inside walls of the flow passage) to be within certain tolerance limits. This is because the orifice or bore defined by the orifice plate must be "centered" within the flow passage of the fitting to ensure accurate measurement of the pressure differential. To be centered, the orifice plate's bore must be concentric with the inside wall of the flow passage of the fitting. If the orifice plate's bore were perfectly concentric within the flow passage of the fitting, the center of the orifice plate bore would be the same distance, in all directions, from both the upstream and downstream inside walls of the fitting. Deviations from perfect concentricity of the orifice plate bore are normally termed "eccentricity" by natural gas industry standards for orifice plates. As used herein, "eccentricity" is used to describe the amount of a deviation from perfect concentricity.

Until fairly recently, most standards allowed the orifice plate to be centered within the pipeline with somewhat liberal tolerance. In 1980, a new International Standard, ISO-5167, was promulgated. This standard drastically reduced the preexisting tolerances. Because of these new tolerances, this new standard focused new attention on the centering of the orifice plate. More recently, revised standards with revised tolerances for centering an orifice plate's bore have been issued. An example of such a revised standard is the standard set forth in Chapter 14, Section 3 of the 1991 version of the *API Manual of Petroleum Measurement Standards,* which is incorporated by reference herein. In conjunction with the revised standards for tolerances of "eccentricity," more rigorous industry standards have been imposed on the maximum allowable eccentricity of the bores of orifice plates. For example, Chapter 14, Section 3 of the 1991 version of the *API Manual of Petroleum Measurement Standards* sets a revised standard for concentricity that has been accepted by the American Gas Association, the Gas Processors Association and as an American National Standard (ANSI). Similar centering requirements set forth in the above standards have also been adopted by a revised International Standard ISO-5167, formally entitled "Measurements of Fluid Flow by Means of Pressure Differential Devices, 1991 Edition," thus establishing world-wide acceptance of similar standards for centering an orifice plate bore within an orifice fitting's flow passage.

Such current industry standards provide a maximum eccentricity value for deviations from perfect concentricity in both the horizontal and vertical directions. The "horizontal" direction, as used herein, is defined for convenience as the direction parallel to the longitudinal axis of the flow passage and parallel to the plane of the pressure taps used to measure the pressure differential, as shown by the arrow labeled "H" in FIG. 2. The "vertical" direction, as used herein, is defined for convenience as the direction perpendicular to the longitudinal axis of the flow passage and perpendicular to the plane of the pressure taps, as shown by the arrow labeled "V" in FIG. 2. Hence, references herein to "up," "down," "top," "bottom," and the like will be understood to follow the convention for "vertical" and "horizontal" noted above. These definitions follow the usage of the API Standards discussed above. Of course, those skilled in the art will understand that an orifice fitting may need to be installed in an unusual position because of surrounding conditions, such as a pipe or the like, or to facilitate the measurement of moist gases. In such cases, terms such as "vertical" and "horizontal" and the like will still be understood in reference to the directions as defined above.

One method of determining eccentricity values is described in Chapter 14, Section 3, Paragraph 2.6.2.1 of the 1991 version of the *API Manual of Petroleum Measurement Standards*. In this method, the perpendicular distance between the edge of an installed orifice plate's bore and the inside wall of the pipeline is measured at the location of a pressure tap, a well known device typically used to measure the pressure differential in an orifice fitting. Typically, the pressure differential is measured by the use of two pressure taps, one located on the upstream side of the orifice plate and one located on the downstream side of the orifice plate. As is well known in the art, these pressure taps are aligned in the same plane as the direction of flow of the fluid, parallel to the longitudinal axis of the flow passage and each extends inward through the flow passage of the orifice fitting to the flow of fluid.

The same measurements are then taken on the opposite side of the flow passage, 180 degrees from the location of the first measurement. One half of the difference between the two measurements represents the eccentricity value in the horizontal direction. Two similar measurements are then taken in the vertical direction. (This method assumes that the orifice plate's bore and the inside wall of the pipeline are round to within a tolerance smaller than the maximum allowable eccentricity value.) One means of making such eccentricity measurements is by the use of an eccentricity gauge, such as the TCS Eccentricity Gauge marketed by TCS Sales of Bossier City, La. Other technically valid techniques for measuring eccentricity are also acceptable under this API standard and are well known to those skilled in the art.

Very small deviations from concentricity in the horizontal direction can cause relatively large errors in the pressure differential measurement. The pressure differential measurement is not as sensitive to deviation from concentricity in the vertical direction. Therefore, industry standards generally impose tolerance limits in the horizontal eccentricity value that are more stringent than the tolerances allowed in the vertical direction. For example, the standard set forth in Chapter 14, Section 3 of the 1991 version of the *API Manual of Petroleum Measurement Standards* imposes a horizontal eccentricity tolerance four times tighter than its vertical tolerance. The problems in maintaining acceptable values of eccentricity in the horizontal direction are exacerbated by the fact that orifice fitting devices are sometimes installed in a sideways position to facilitate flow measurement in moist gases. When the orifice fitting is installed horizontally, the horizontal direction (as previously defined herein) is perpendicular to the ground, and thus, gravity can contribute to or exacerbate existing deviations from concentricity in the horizontal direction.

One way in which eccentricity tolerances have been met (i.e., the orifice plate bore has been centered) in the past has been by manufacturing the orifice plate, the orifice plate's bore, the orifice plate carrier, and the seals to extremely tight tolerances, and then manually positioning the orifice plate carrier in place. The orifice plate carrier was typically positioned through the use of adjustable set screws. The set screws would be manually adjusted by an operator in response to repeated measurements to determine eccentricity, until the centering of the orifice plate carrier was accomplished. The set screws would then be welded in place.

One disadvantage of this technique is that the tolerances associated with the manufacture of the orifice plate, the orifice plate's bore, the orifice plate carrier, the seals, the clearance required between the plate carrier and the set screws, and the inside diameter of the orifice fitting are cumulative. As is well known in the art, where there is a "stacking" of tolerances, the resulting assembly may not meet the applicable requirements even though each of the individual components meet its own rather restrictive tolerance. Hence, even though each of the components in a typical plate carrier assembly might fall within the specified tolerances, the horizontal eccentricity value of such assemblies would still exceed the industry standard.

Further, the industry standards do not set a standard for the outer diameter of the orifice plate, or the tolerance limits within which this dimension must be maintained. This fact introduces more uncertainty into the centering of the orifice plate carrier assembly, since centering the entire orifice plate carrier assembly to center the orifice plate's bore is dependent upon the tolerances of the constituent parts of the orifice plate carrier assembly.

Additional difficulties arise from other components. For example, the seal is typically made from an elastomeric material. Such materials are often difficult to mold to the restrictive tolerances required. The seal tends to swell over its lifetime. Since such swelling is not always perfectly uniform, it introduces more error into the initial centering process. Also, because the seals used in typical orifice plate carrier assemblies completely surround the outer circumference of the orifice plate, they prohibit movement of the orifice plate. As a result, the orifice plate and therefore, the orifice plate's bore, often must be centered by aligning the orifice plate within the seal, then the seal within the plate carrier, and then the plate carrier within the fitting, rather than by centering the orifice plate itself. Hence, the bore of the orifice plate was centered within the pipeline bore only indirectly, not directly. Moreover, this process involved a substantial amount of effort by human operators.

SUMMARY OF THE INVENTION

In the present invention, the orifice plate and thus the orifice plate's bore are directly centered within the flow passage of the orifice fitting by means of a cradle. The orifice plate carrier has a recessed seat in which the orifice plate sits, with the seat defining a bore in the orifice plate carrier. A seal is used to seal the interface between the orifice plate and the body of the orifice fitting. The bottom portion of the orifice plate carrier's recessed seat contains one or more slots through which a bottom portion of the outer peripheral edge of the orifice plate protrudes. The downstream side of the orifice plate carrier also has one or more channels which extend from the bottom of the plate carrier up to the slots in the orifice plate carrier and the protruding bottom portion of the orifice plate. The cradle fits into the channels and has one or more locating surfaces which abut and hold the bottom portion of the orifice plate protruding through the slots in the orifice plate carrier. The cradle's position (and therefore the position of the orifice plate and its bore) can be adjusted via an operator's use of adjustable set screws provided for that purpose. Once the bore of the orifice plate has been centered within the flow passage of the orifice fitting, the cradle can be secured in place by welding the set screws in the body of the orifice fitting or by welding the cradle into place.

It is an object of the present invention to provide an apparatus for accurately and directly centering an orifice plate and thus, and orifice plate's bore, in an orifice fitting.

Another object of the present invention is to provide an apparatus for accurately centering an orifice plate and thus, an orifice plate's bore, in an orifice fitting device which avoids the deviations from concentricity caused by the accumulation (i.e., "stacking") of tolerances of the components of the orifice carrier plate assembly, the set screws, and the inside diameter of the orifice fitting.

Another object of the present invention is to provide an apparatus for accurately centering an orifice plate and thus, an orifice plate's bore, in an orifice fitting device which uses commercially available orifice plates and fewer movable parts than orifice fittings described in the prior art.

Another object of the present invention is to provide an apparatus for accurately centering an orifice plate and thus, an orifice plate's bore, in an orifice fitting device which greatly restricts the movement of the orifice plate in the horizontal direction, which is subject to more stringent tolerances.

Another object of the present invention is to provide an apparatus for accurately centering an orifice plate and thus, an orifice plate's bore, in an orifice fitting device, which assures compliance with industry standards for orifice eccentricity values.

Another object of the present invention is to provide a method for accurately centering an orifice plate within an orifice fitting device by directly centering the orifice plate within the orifice fitting device.

The above and other advantages of the present invention will become readily apparent to those skilled in the art from the following detailed description of the invention, and from the attached drawings, which are briefly described below.

DETAILED DESCRIPTION OF THE INVENTION

Figure 1:
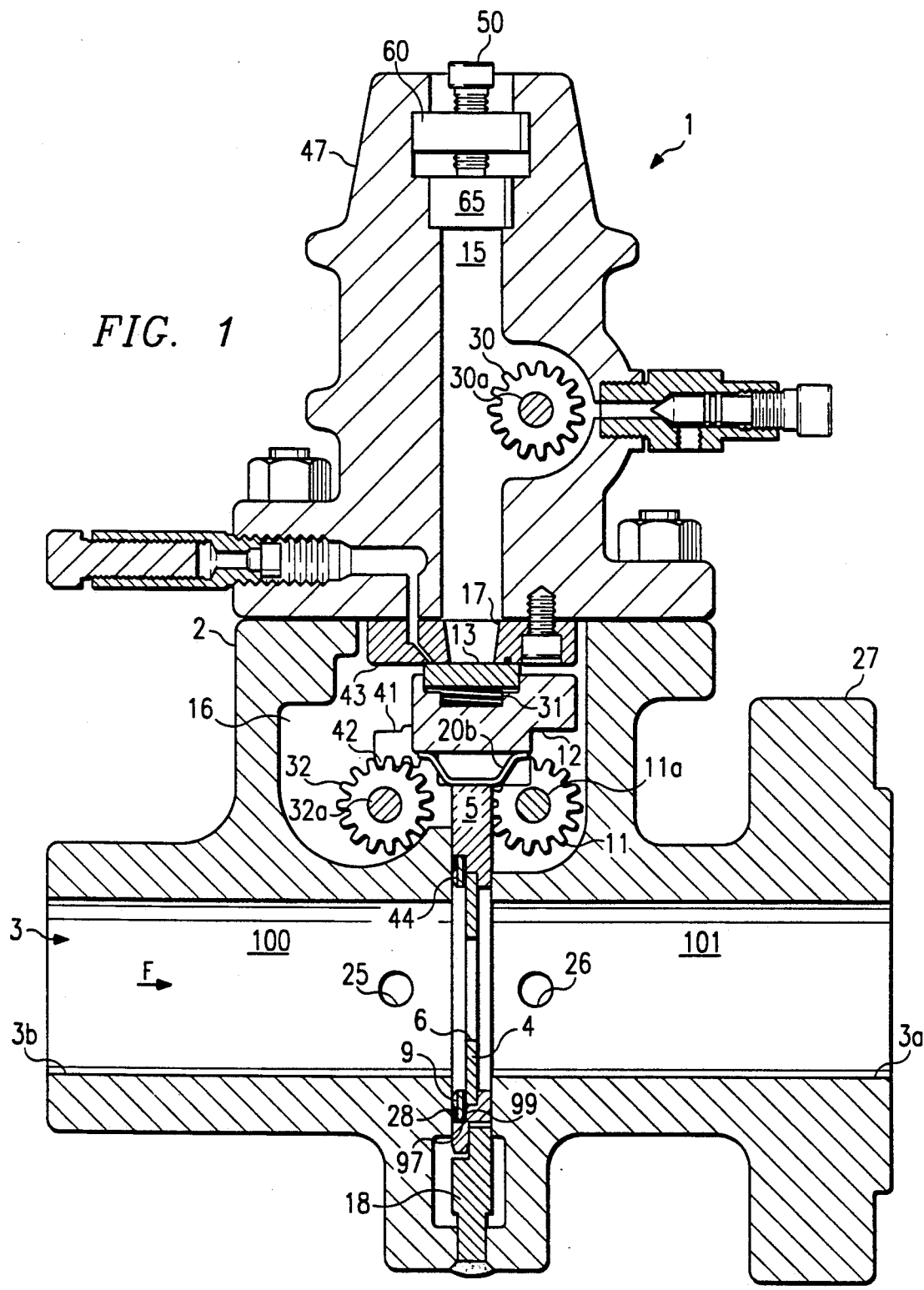
FIG. 1 is a sectional view of an orifice fitting.

Referring first to FIG. 1, a sectional view of an orifice fitting 1 is shown in a normal, upright position. The orifice fitting 1 shown is type known as a "dual-chambered" orifice fitting. As discussed below, this type of fitting is characterized by the use of two chambers. Although the invention is shown and described as it applies to dual-chambered fittings, it will be apparent to those skilled in the art that the invention could easily be used in single-chambered orifice fittings and that the invention should not be considered limited to merely dual-chambered orifice fittings.

Still referring to FIG. 1, orifice fitting 1 is usually made of steel and is an assembly that includes a body structure 2 and a housing 47. Connection flange 27 is formed to permit connection of the downstream side 3b of the flow passage 3 to a pipeline (not shown). The upstream side 3b of flow passage 3 is also adapted for connection to a pipeline. For illustrative purposes, this discussion proceeds on the basis of having a fluid, such as natural gas, flowing through flow passage 3 in the direction indicated by the arrow "F" shown in FIG. 1. In FIG. 1, an orifice plate carrier 5 is located in its operating position in flow passage 3. As shown in FIG. 1, a bottom edge of the orifice plate carrier 5 is located in a seat slot 28, which is formed in the body structure 2 of the orifice fitting 1, when the plate carrier 5 is in its operating position.

Still referring to FIG. 1, an upstream pressure tap 25 and a downstream pressure tap 26. Pressure taps 25 and 26 can be of the type which are well known in the art. Pressure taps 25 and 26 are used to measure the pressure differential which exists across the orifice plate 5.

As shown in FIG. 1, an upper chamber 15 and lower chamber 16 provide additional volume so that orifice plate carrier 5 may be removed from body structure 2 and housing 47 without shutting off the flow of the fluid passing through flow passage 3. By means discussed in more detail below, the plate carrier 5 can be removed from its operating position in the flow passage 3 to the upper chamber 15. From there, it can be removed by means (not shown) for cleaning, repair, or replacement. A seat 43, which has an opening 17, is located between upper chamber 15 and lower chamber 16. The opening 17 is sealed by slide valve strip 13 when orifice plate carrier 5 is located either entirely within upper chamber 15 or in its operating position in flow passage 3.

As also shown in FIG. 1, a slide valve carrier 12 is located in lower chamber 16 and moves slide valve strip 13 across opening 17 or away from opening 17, as an operator may choose. Slide valve strip 13 is urged upward toward upper chamber 15 and against the bottom side of seat 43 by spring 31. In its closed position (as shown in FIG. 1), slide valve strip 13 seals lower chamber 16 from upper chamber 15, preventing any fluid communication therebetween. Gear 32 engages the teeth 42 on bar 41, located on the bottom side of slide valve carrier 12. When an operator turns a crank (not shown), gear 32 engages the teeth 42 to thereby move slide valve carrier 12 in the direction parallel to the longitudinal axis of flow passage 3.

When orifice plate carrier 5 is to be ready for operation and is in its operating position in the flow passage 3 as shown in FIG. 1, slide valve carrier 12 will be in the closed position. In its closed position, the slide valve carrier 12 is positioned so that the slide valve strip 13 is located under and contacts the bottom of seat 43, thereby closing the opening 17. Gear 32 is attached to a shaft 32a which leads to an external handle (not shown). As noted, gear 32 engages teeth 42 on bar 41, located on the bottom side of slide valve carrier 12, to move slide valve carrier 12. An operator can also use the handle (not shown) to turn gear 32 and move the slide valve carrier 12 to the open position (not shown) off to the left side of the opening 17.

Figure 2:
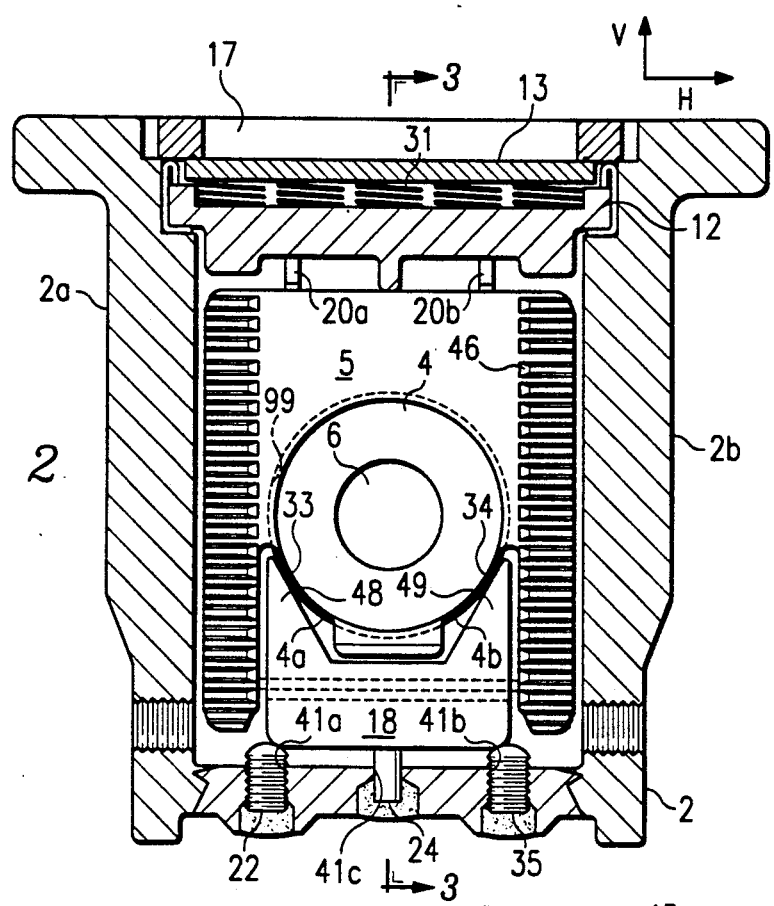
FIG. 2 is a sectional view of the lower chamber of a dual-chambered orifice fitting.
Figure 4:
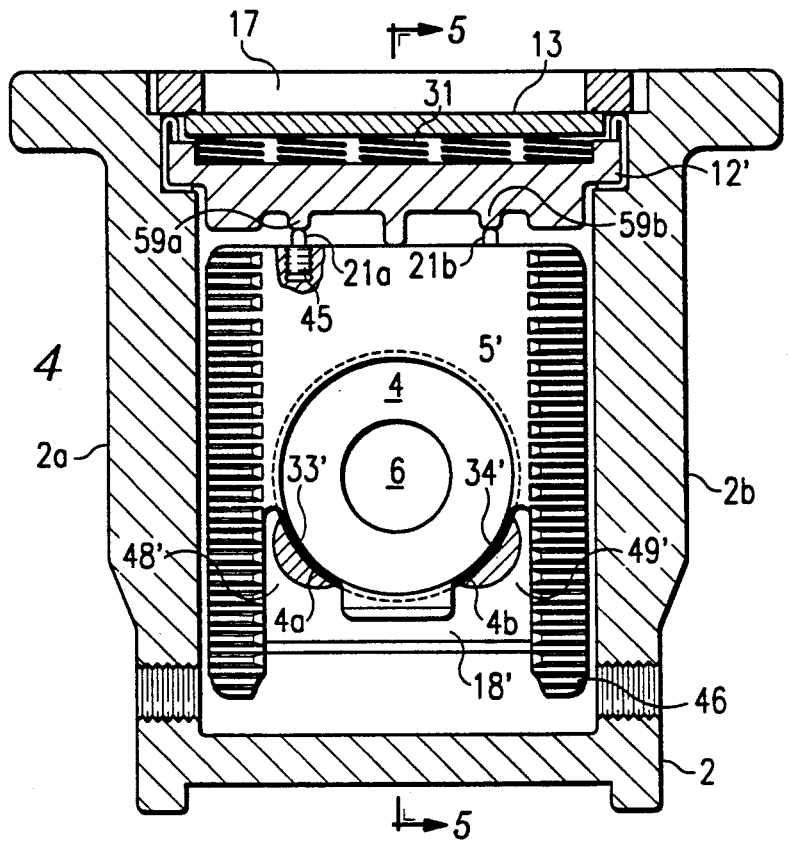
FIG. 4 is a front sectional view of the lower chamber of a dual-chambered orifice fitting made in accordance with an alternative embodiment of the invention.

In the preferred embodiment and as shown in FIG. 2, slide valve carrier 12 is located on top of a beam springs 20a and 20b which are attached to the bottom of the slide valve carrier 12. Thus, when slide valve carrier 12 is in its closed position (as shown in FIG. 1), the beam springs 20a and 20b abut against the top edge of orifice plate carrier 5 and urge orifice plate carrier 5 downward. Thus, the beam springs 20a and 20b, by urging the orifice plate carrier 5 in a downward direction, also indirectly urge the orifice plate 4 firmly against locating surfaces 33 and 34 of cradle 18, as discussed more fully below and as shown in FIGS. 2 and 4. Beam springs 20a and 20b thus assure firm contact between orifice plate 4 and locating surfaces 33 and 34, whether orifice fitting 1 is installed horizontally or vertically.

Gear 11 connects to a shaft 11a which connects to an external handle (not shown). A gear rack (shown in FIG. 2) on the back of orifice plate carrier 5 engages teeth on gear 11. When the handle is turned, gear 11 rotates and moves the plate carrier 5 vertically in and out of flow passage 3. Gear 30 located in upper chamber 15 engages orifice plate carrier 5 after orifice plate carrier 5 has been moved sufficiently out of its operating position into upper chamber 15 by gear 11.

Figure 7:
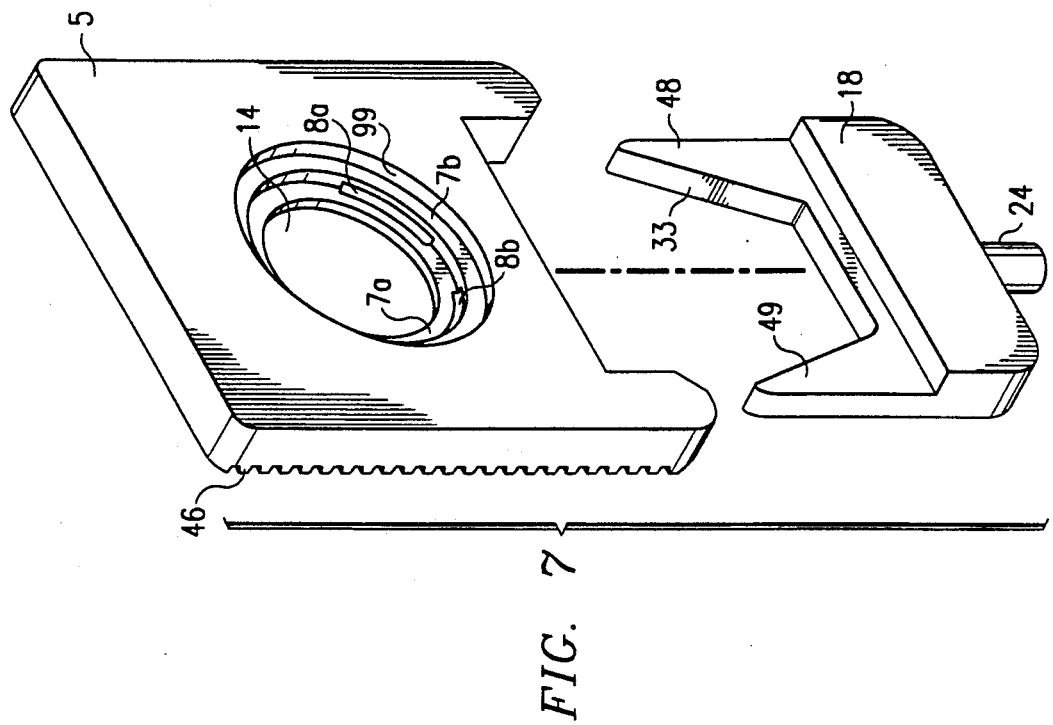
FIG. 7 is an exploded view showing the plate carrier and the cradle from the upstream side.

Referring now to FIG. 7, the upstream side of orifice plate carrier 5 is shown. (For ease of reference, all of the Figures herein use like numbers for like components). Orifice plate carrier 5 has recessed seats 7a and 7b for receiving orifice plate 4 (not shown in FIG. 7) and seat 9 (also not shown in FIG. 7), respectively. Referring still to FIG. 7, the seat 7a of the orifice plate carrier 5 has slots 8a and 8b. As shown, slots 8a and 8b are located in the bottom half of the seat 7a of the orifice plate carrier 5. Slots 8a and 8b are shaped so as to allow bottom portions of the peripheral edges 4a and 4b of orifice plate 4 (not shown in FIG. 7) to extend through slots 8a and 8b and thus protrude from seat 7a. I prefer to use two slots 8a and 8b as shown in FIG. 7. However, it will be apparent that only one slot of an appropriate size, or perhaps three or more slots, could be used instead.

Referring back to FIG. 1, seal 9 fits on the peripheral edge of the upstream side of orifice plate 4. Seal 9 is preferably an annular seal made of an elastomeric material, but may be made of a fluoropolymer or metal with either elastomeric or fluoropolymer seals, or of metal encased by elastomeric material. For best results, (and as shown in FIG. 1), I prefer to use a seal 9 which has a metal ring 44 encased in rubber. A portion of seal 9 protrudes beyond the plane of the front side of orifice plate carrier 5. When orifice plate carrier 5 is not in its operating position, seal 9 is held against orifice plate 4 (within the seat 7b which is shown in FIG. 7) by friction between outer circumference 97 of seal 9 and inner surface 99 of orifice plate carrier 5. When orifice plate carrier 5 is in its operating position, the portion of seal 9 which protrudes beyond the plane of the upstream side of orifice plate carrier 5 abuts body structure 2. Seal 9 is compressed when orifice plate carrier 5 is in its operating position and seal 9 is secured in place by means of a compression fit between orifice plate carrier 5, orifice plate 4, and body structure 2. As shown in FIG. 1, seal 9 seals off the flow of fluid between the face of orifice plate 4 and body structure 2, so that the fluid within flow passage 3 is forced through orifice plate bore 6. Seal 9 seals only the upstream side 100 of orifice plate 4, and does not completely encase orifice plate 4. Because seal 9 does not completely encase orifice plate 4, orifice plate 4 is allowed to move relatively freely within orifice plate carrier 5, and therefore, orifice plate 4 and thus orifice plate bore 6 may be centered within the flow passage 3 of orifice fitting 1 by direct contact with locating surfaces 33 and 34 on cradle 18 (which are described more fully below).

Referring now to FIG. 2, a cross section of the body structure 2 of the orifice fitting 1 is shown from its downstream side. As noted above, the direction indicated by the arrow "V" in FIG. 2 is described herein as the "vertical" direction. At the same time, the direction indicated by the arrow "H" in FIG. 2 is described herein as the "horizontal" direction. As will be apparent to those skilled in the art, these references are chosen for purposes of convenience. Of course, orifice fittings may be installed in unusual positions or at unusual angles from time to time. Thus, the choice of these directions should not be construed to limit the possible applications of the present invention. The cradle 18 is shown resting on adjustable set screws 22 and 35. A stem 24, which is a part of cradle 18, descends from the bottom edge of cradle 18 and into body structure 2.

The use of a prefabricated metal part as cradle 18 is preferred, although body structure 2 may be machined to form cradle 18 or weld metal may be inserted into body structure 2 and then machined to form cradle 18.

However, the machining of a portion of body structure 2 to form cradle 18 is difficult and the use of weld metal as cradle 18 increases the possibility of creating defects in body structure 2 through the welding process.

Figure 6:
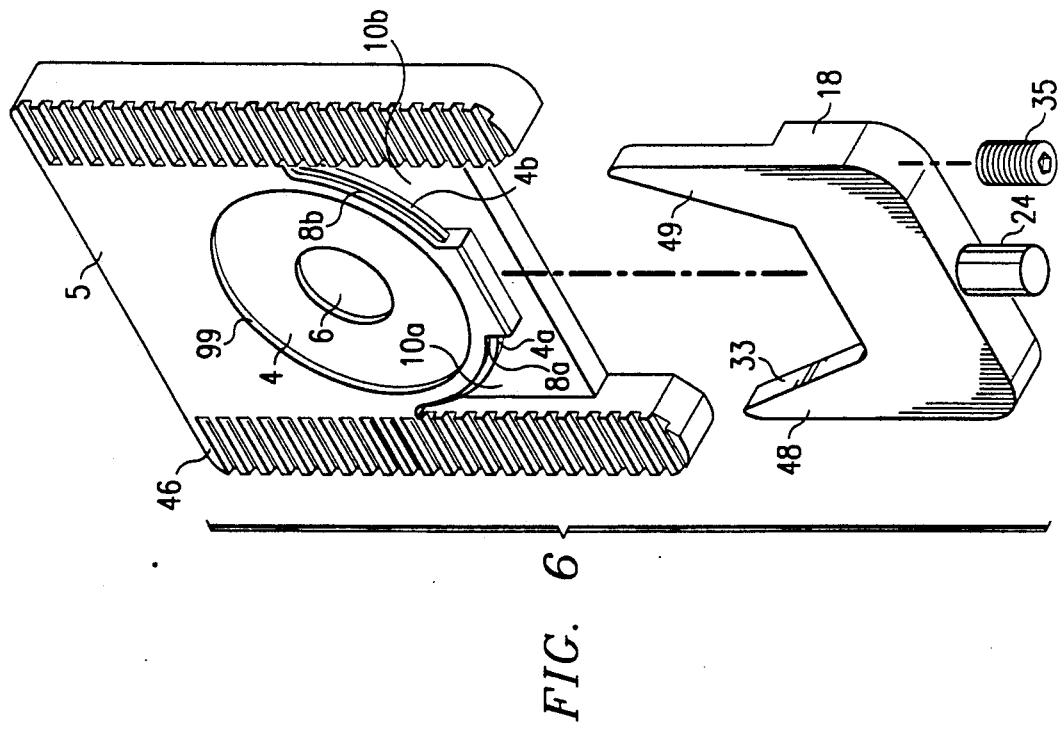
FIG. 6 is an exploded view showing the plate carrier, the orifice plate, a cradle, and an adjustable set screw from their downstream side.

As also shown in FIG. 2, arms 48 and 49 on cradle 18 extend upwardly on the downstream side of the orifice plate carrier 5. Each of the arms 48 and 49 has a corresponding locating surface. Locating surfaces 33 and 34 are preferably straight surfaces inclined at an angle of roughly 60 degrees from horizontal. However, the locating surfaces 33 and 34 need not be at such an angle. Moreover, the locating surfaces 33 and 34 need not be linear; they can be arcuate in shape. As detailed below, locating surfaces 33 and 34 only need to be able to contact the corresponding portions 4a and 4b of the peripheral edge of orifice plate 4. As shown in FIG. 2, locating surfaces 33 and 34 directly contact portions 4a and 4b of the peripheral edge of orifice plate 4. As shown in FIG. 6, the bottom portions 4a and 4b of the orifice plate 4 protrude from slots 8a and 8b in orifice plate carrier 5 when orifice plate carrier 5 is in its operating position in flow passage 3.

Referring back to FIG. 2, it can be seen that, by locating them on opposite sides of orifice plate 4, locating surfaces 33 and 34 thereby restrict the movement of orifice plate 4 in the horizontal direction. When the cradle 18 is moved upwards by the use of set screws 22 and 35 (discussed below), the locating surfaces 33 and 34 move the orifice plate 4 upwards. The upper peripheral edge of the orifice plate 4 is then held by a seat 7a (which is discussed more fully below and is shown in FIG. 7) of the plate carrier 5, thereby restricting the movement of the orifice plate 4 in the vertical direction.

Referring still to FIG. 2, orifice plate carrier 5 is located between two walls 2a and 2b of body structure 2. Cradle 18 is inserted into and attached to the body structure 2 of orifice fitting 1 during the assembly of orifice fitting 1. The stem 24 of cradle 18 is inserted through a hole 41c in body structure 2. Cradle 18 is positioned in place by adjustable set screws 22 and 35. The set screws 22 and 35 are, in turn, inserted through holes 41a and 41b in body structure 2. Once set screws 22 and 35 have been inserted through holes 41a and 41b, they can be manually tightened to move the cradle 18 in an upward direction, thereby causing locating surfaces 33 and 34 to engage the protruding bottom portions 4a and 4b of the peripheral edge of orifice plate 4. In like fashion, the set screws can be loosened if needed. Once locating surfaces 33 and 34 engage orifice plate 4, an operator can further manually tighten set screws 22 and 35, thus moving cradle 18 and, in turn, orifice plate 4 until the center of orifice plate bore 6 is centered, within the applicable tolerance limits, within the flow passage 3.

Referring now to FIG. 6, an exploded view is provided of the orifice plate carrier 5 with an orifice plate 4 in the seat 7a (seat 7a is not shown in FIG. 6), the cradle 18 and set screw 35. FIG. 6 provides a view of these components from the downstream side of the orifice plate carrier 5. As is shown in FIG. 6, bottom portions 4a and 4b of the peripheral edge of the orifice plate 4 extend or protrude through slots 8a and 8b in the plate carrier 5. The arms 48 and 49 of the cradle 18 extend up through the channels 10a and 10b to the slots 8a and 8b. The locating surfaces 33 and 34 (only locating surface 33 is shown in FIG. 6) are each designed to contact a corresponding portions 4a and 4b of the peripheral edge of the orifice plate 4 which protrudes through the slots 8a and 8b.

In connection with the centering of the orifice plate bore 4 by the positioning of cradle 18 (and thus locating surfaces 33 and 34), deviations from concentricity may be measured using any standard means used in the industry. As described previously, I prefer to make the initial eccentricity measurements by using an eccentricity gauge, such as the TCS Eccentricity Gauge, which is commercially available from TCS Sales of Bossier City, La. For best results, I prefer to position the cradle by using a precisely machined fixture (not shown) to simulate a perfectly centered orifice plate. The fixture is placed in the orifice fitting 1 and then the locating surfaces 33 and 34 and the cradle 18 are positioned so that the portion of the fixture which corresponds to the bottom portions 4a and 4b of the peripheral edge of orifice plate 4 abuts the locating surfaces 33 and 34 of the cradle 18. The set screws 22 and 35 are adjusted to position the cradle 18. By adjusting the set screws 22 and 35 to position the cradle 18, the cradle 18 can be effectively positioned and then secured in place. The fixture is then removed from the orifice fitting 1 and is replaced with a plate carrier assembly, consisting of the orifice plate 4, the orifice plate carrier 5, and a seal 9. When this plate carrier assembly is moved into its operating position in the flow passage 3, the fixed position of the cradle 18 (and more particularly, the locating surfaces 33 and 34) will center the orifice plate 4, and thus, orifice plate bore 6.

It is possible to create a fixture which precisely meets the specifications of the orifice plate 4 and the orifice plate bore 6, especially as combined in the orifice plate carrier 5 described and shown herein. Hence, by using the fixture in the fitting 1 in the manner described above, the cradle 18 can be positioned so that, when the fixture is removed, and a plate carrier 5 is positioned in its operating position, the orifice plate 4 and, more particularly, the orifice plate bore 6, will be centered. In most commercially available orifice plates, the orifice plate's bore is machined precisely in the orifice plate while the plate is held rigidly in place. Due to this precise machining technique, the orifice plate's bore is almost perfectly concentric with the outer circumference of the orifice plate. Therefore, centering the orifice plate within the flow passage will, in turn, center the orifice plate's bore. Other accepted methods of measuring deviations from concentricity are well known to those skilled in the art and could be used to position the cradle 18.

When an operator wishes to replace orifice plate 4, the operator can use a commercially available replacement orifice plate 4, which has the same size (but may vary within tolerances of approximately several thousandths of an inch) as the first, in orifice plate carrier 5 with the assurance that the new orifice plate 4 and thus, the new orifice plate bore 6, will be centered by the already-positioned locating surfaces 33 and 34 on cradle 18 without the need for any further eccentricity measurements. Likewise, if an operator wishes to replace orifice plate carrier 5 or seal 9, orifice plate 4 and thus, orifice plate bore 6 will automatically be directly centered by locating surfaces 33 and 34 on cradle 18 when the combined assembly of orifice plate carrier 5, orifice plate 4, and seal 9 is repositioned within fitting 1.

Thus, orifice plate 4, and therefore orifice plate bore 6, are centered within orifice plate carrier 5 by direct contact with locating surfaces 33 and 34 on cradle 18.

As noted, locating surfaces 33 and 34 can be either angled or arcuate; they restrict the movement of orifice plate 4 both in the horizontal and vertical directions, but more so the horizontal which (as noted above) is subject to more stringent tolerance requirements. Moreover, when orifice fitting 1 is installed horizontally, gravity can cause additional problems in meeting applicable tolerances. However, locating surfaces 33 and 34 directly hold the bottom portions 4a and 4b of the peripheral edge of orifice plate 4 and, together with the use of beam springs 20a and 20b (described above), thus prevent the orifice plate 4 from moving out of position due to gravity.

Once cradle 18 has been properly positioned in the fitting 1, the locating surfaces 33 and 34 ensure that orifice plate 4 and thus orifice plate bore 6 are always centered with respect to flow passage 3 and the upstream and downstream inside walls of the pipeline (not shown), particularly with respect to the more critical horizontal direction. The only tolerance that could potentially have a substantial effect on the centering of orifice plate bore 6 in the horizontal direction is the concentricity of orifice plate bore 6 with the outer circumference of the orifice plates. As previously stated, the effect of this tolerance on the centering of commercially available orifice plates is insignificant because most orifice plates have bores therein which are concentric with the outer circumstance to an extremely high tolerance. The present invention thus avoids the problem of the "stacking" of tolerances so common in the prior art.

Referring back to FIG. 2, once cradle 18 has been installed and positioned in the manner described, the stem 24 of cradle 18 is then welded to body structure 2. Set screws 22 and 35 hold cradle 18 in place while the stem 24 of cradle 18 is welded to body structure 2. Once the stem 24 of cradle 18 is welded, set screws 22 and 35 can be welded in place in holes 41a and 41b in body structure 2. By welding the stem 24 and the set screws 22 and 35 into place, the cradle 18 can be fixed in an appropriate position within fitting 1 so that, when any commercially available orifice plate 4 of the appropriate size is used, the orifice plate 4 and, more particularly, the orifice plate bore 6 will be centered within the flow passage 3 and will be within the appropriate standards for eccentricity.

Figure 8:
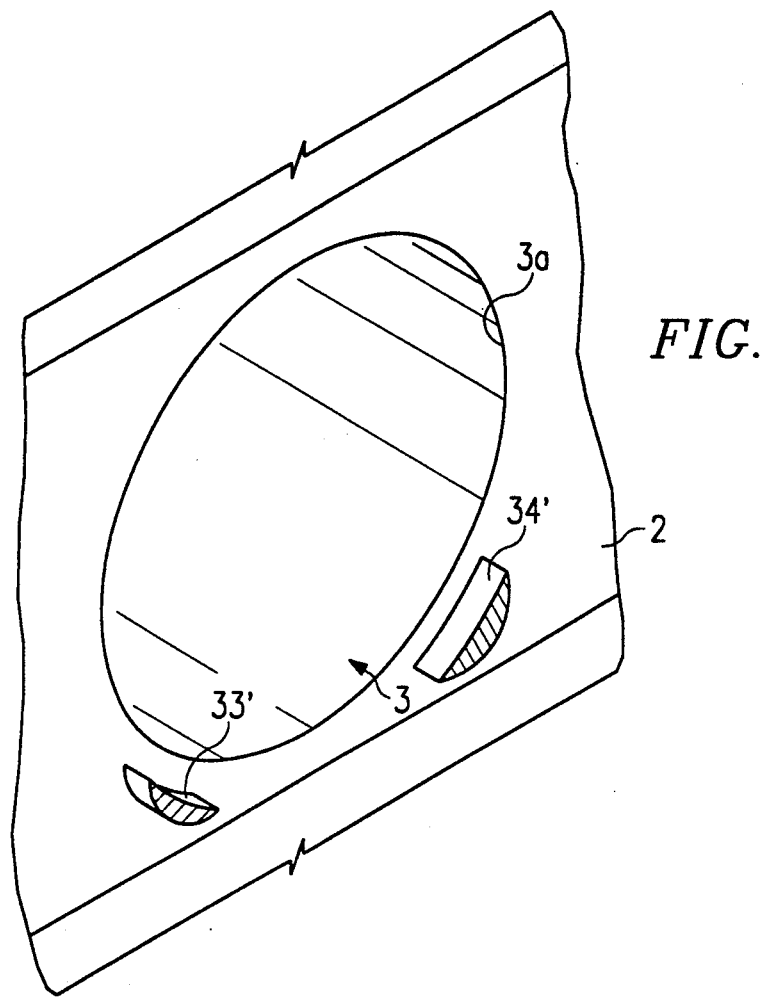
FIG. 8 is a perspective view of an alternative embodiment of the invention.

In an alternate embodiment of the invention which is shown in FIGS. 4 and 8, cradle 18' is formed by machining body structure 2, which is comprised of cast metal, into the shape of cradle 18' with arcuate locating surfaces 33' and 34'. In yet another alternative embodiment of the invention, metal may be welded in body structure 2 and machined to form cradle 18' with arcuate locating surfaces 33' and 34', as shown in FIGS. 4 and 8. (The resulting locating surfaces 33' and 34' will be the same regardless of whether the metal is welded, then machined, or is formed by machining the body structure 2.) Such weld metal may be cast steel or stainless steel.

Figure 5:
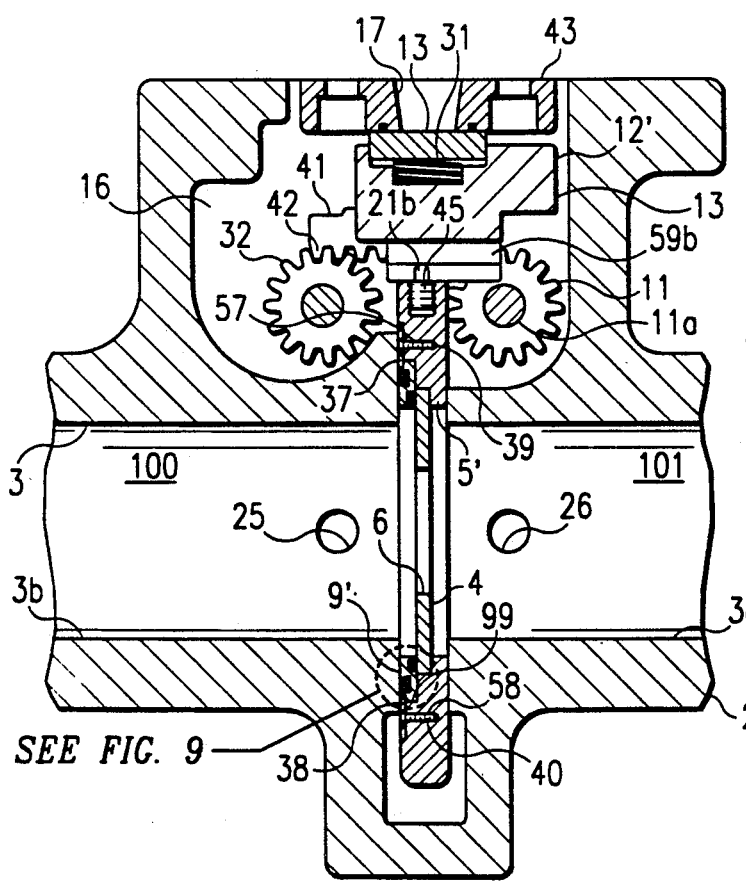
FIG. 5 is a sectional view taken along line 5—5 of FIG. 4.

Yet another alternative embodiment is shown in FIG. 5. In FIG. 5, tabs 37 and 38 are located on the top and bottom sides, respectively, of orifice plate bore 6 and secure seal 9 to orifice plate carrier 5. Tabs 37 and 38 are affixed to the orifice plate carrier 5 by screws 39 and 40, which are inserted through bores in tabs 37 and 38 and through holes 57 and 58 in orifice plate carrier 5.

Figure 9:
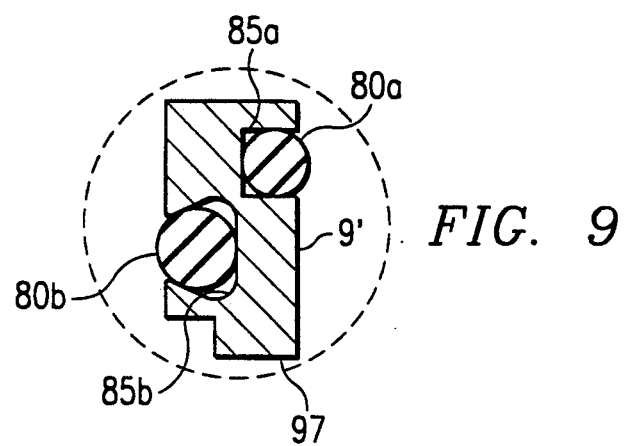
FIG. 9 is an enlarged view of a portion of the alternate embodiment of the invention shown in FIG. 5.

In the alternate embodiment shown in FIGS. 5 and 9, metal O-rings 80a and 80b are located in grooves 85a and 85b located on each side of seal 9', and assist in establishing a seal between orifice plate 4 and body structure 2.

OPERATION

The following discussion, except where noted, is with reference to FIG. 1. To insert an orifice plate carrier 5 and orifice plate 4 into a dual-chambered orifice fitting 1, an operator first removes bolts 50-55 (only one of which is shown in FIG. 1), which are located on top of housing 47. Then, clamping bar 60 and upper chamber sealing bar 65 are removed. Orifice plate carrier 5, into the seats 7a and 7b, into which orifice plate 4 and seal 9, respectively, have been manually inserted, can be manually inserted in upper chamber 15. Teeth on gear 30 engage a gear rack 46 (shown in FIG. 2, for example) on the downstream side of orifice plate carrier 5. The operator then turns a handle (not shown) which causes gear 30 to move, thus lowering orifice plate carrier 5 further down into upper chamber 15. Once orifice plate carrier 5 has been lowered sufficiently, upper chamber sealing bar 65, clamping bar 60 and bolts 50-55 are replaced. After lowering the plate carrier 5 into the upper chamber 15 and then re-sealing the upper chamber 15 as noted, the operator can then proceed to lower the plate carrier assembly from the upper chamber 15 to the lower chamber 16.

During the movement of orifice plate carrier 5 into or out of the lower chamber 16, slide valve carrier 12 is, of course, in its open position. As noted above, gear 32 is connected to a handle (not shown) to allow an operator to move gear 32 which, in turn, moves slide valve carrier 12. As orifice plate carrier 5 passes through opening 17 in seat 43, which is located between upper chamber 15 and lower chamber 16, teeth on gear 11 engage the gear rack 46 on the back of orifice plate 5 (shown in FIG. 2, for example). The operator turns a handle (not shown), which acts upon gear 11 to lower orifice plate 5 into its operating position within the flow passage 3. In this position, the bottom edge of the plate carrier 5 fits into seat slot 28 in the bottom of body structure 2. As orifice plate carrier 5 is lowered into seat slot 28, locating surfaces 33 and 34 on cradle 18 (as shown in FIG. 2) contact the bottom portions 4a and 4b of the peripheral edge of orifice plate 4 which protrude from slots 8a and 8b. Initially, gear 11 urges orifice plate carrier 5 downward, thereby urging orifice plate 4 against locating surfaces 33 and 34.

Figure 3:
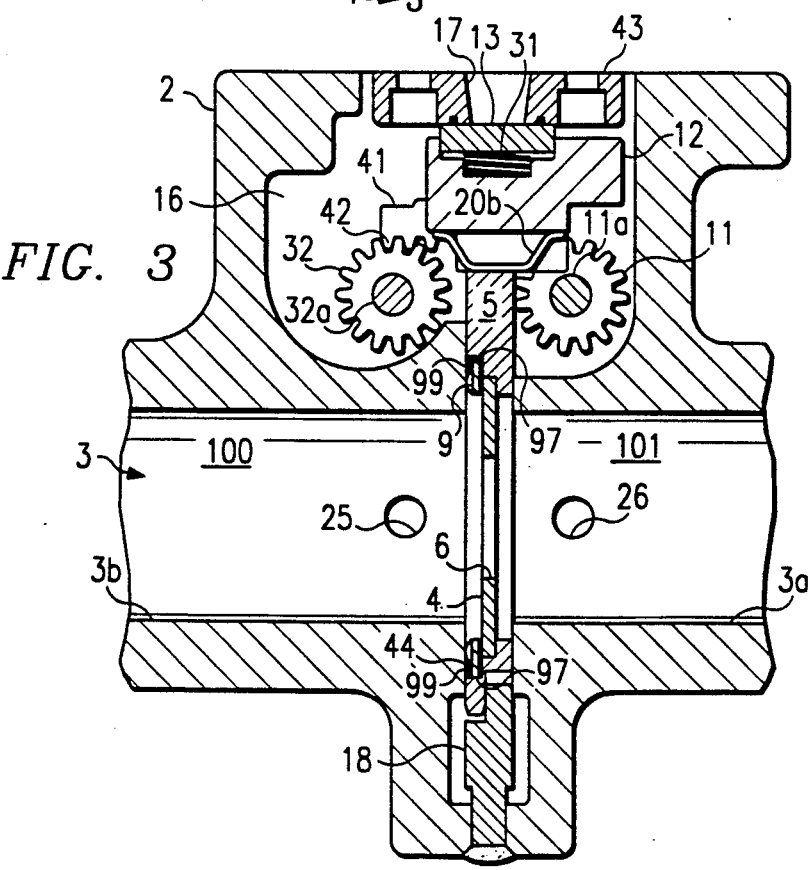
FIG. 3 is a sectional view taken along line 3—3 of FIG. 2.

As previously described, seal 9 is compressed between body structure 2 on its upstream side, and orifice plate 4 on its downstream side, when orifice plate carrier 5 is in its operating position. This compression fit, together with gear 11, holds orifice plate carrier 5, and thus, orifice plate 4, in position, as is shown, for example, in FIG. 3. Once the orifice plate carrier 5 has been moved into its operating position, the operator turns a shaft 32a connected to gear 32, which engages teeth 42 on bar 41 located on slide valve carrier 12, and moves slide valve carrier 12 into its closed position. In the closed position, slide valve strip 13 seals opening 17 between upper chamber 15 and lower chamber 16. Beam springs 20a and 20b, mounted on and attached to the underside of slide valve carrier 12, abut the top of orifice carrier 5 when slide valve carrier 12 is in the closed position. Thus, beam springs 20a and 20b push against and urge orifice plate carrier 5 downward, thereby pushing the bottom portions 4a and 4b of the peripheral edge of orifice plate 4 toward locating surfaces 33 and 34, regardless of the orientation of orifice fitting 1 as installed.

In the alternate embodiment shown in FIG. 4, pins 21a and 21b are retractably located on the top portion of orifice plate carrier 5', and contact tabs 59a and 59b formed on the bottom of slide valve carrier 12' when slide valve carrier 12' is in the closed position, thus acting to urge orifice plate carrier 5' downward toward locating surfaces 33 and 34. Locating surfaces 33 and 34, in turn, firmly engage the bottom portions 4a and 4b of the peripheral edge of orifice plate 4 against the upper portion of the seat 7 of orifice plate carrier 5', thus centering orifice plate bore 6 within orifice fitting 1, as more fully described above.

While the present invention has been shown and described in its preferred embodiment and in alternative embodiments, those skilled in the art will recognize from the foregoing discussion that various changes, modifications, and variations may be made thereto without departing from the spirit and scope of the invention as set forth in the claims.

What is claimed is:

1. An apparatus for centering an orifice plate in an orifice fitting, comprising:
    (a) an orifice fitting body having a flow passage therethrough;
    (b) an orifice plate, removably located in the flow passage, having upstream and downstream sides and a bore therethrough;
    (c) an orifice plate carrier, having upstream and downstream sides and bottom and top portions, a seat for removably supporting and receiving said orifice plate, said seat defining a bore through said orifice plate carrier, wherein the bottom portion of the seat has at least one slot therethrough and wherein at least a portion of said orifice plate protrudes from the seat through the slot, and wherein said plate carrier further has at least one channel on its downstream side which extends from the bottom portion of said plate carrier to the slots;
    (d) sealing means adjacent to said orifice plate for sealing the interface between said orifice plate and said orifice fitting body;
    (e) centering means which extend through the channels in said orifice plate carrier and contact at least part of the portion of said orifice plate which protrudes through the slot, for centering said orifice plate within the flow passage; and
    (f) contacting means for urging said orifice plate carrier toward said centering means and thus urging at least a portion of said orifice plate against said centering means.

2. An apparatus for centering an orifice plate in an orifice fitting as recited in claim 1, wherein said centering means comprises a cradle having at least one locating surface for contacting at least a portion of a peripheral edge of said orifice plate.

3. An apparatus for centering an orifice plate in an orifice fitting as recited in claim 2, wherein said cradle further comprises a prefabricated metal part welded into said orifice fitting body.

4. An apparatus for centering an orifice plate in an orifice fitting as recited in claim 2, wherein said cradle further comprises a portion of said orifice fitting body fabricated to define said cradle.

5. An apparatus for centering an orifice plate in an orifice fitting as recited in claim 2, wherein said cradle comprises weld metal inserted and welded in said orifice fitting body and fabricated to define said cradle.

6. An apparatus for centering an orifice plate in an orifice fitting as recited in claim 1, wherein said orifice plate carrier has a gear rack on at least one side and wherein said contacting means comprises gear means having teeth for engaging the gear rack on said orifice plate carrier.

7. An apparatus for centering an orifice plate in an orifice fitting as recited in claim 1, wherein said contacting means comprises a spring mounted on a slide valve carrier.

8. An apparatus for centering an orifice plate in an orifice fitting as recited in claim 1, wherein said contacting means comprises at least one pin retractably mounted on the top portion of said orifice plate carrier.

9. An apparatus for centering an orifice plate in an orifice fitting as recited in claim 2, wherein the bottom of said orifice fitting body has at least one hole therein, and wherein said cradle has a stem portion descending from said cradle and extending through the hole in said orifice fitting.

10. An apparatus for centering an orifice plate in an orifice fitting as recited in claim 9, further comprising positioning means for positioning said cradle.

11. An apparatus for centering an orifice plate in an orifice fitting as recited in claim 10, wherein said positioning means comprises at least one adjustable set screw which contacts the bottom of said cradle and wherein said screw is inserted through at least one hole in the bottom of said orifice fitting body.

12. An apparatus for centering an orifice plate in an orifice fitting as recited in claim 11, wherein said screw and the stem portion of said cradle are welded to said orifice fitting body.

13. An apparatus for centering an orifice plate in an orifice fitting as recited in claim 1, wherein said sealing means comprises an annular seal having an outer and an inner circumference removably attached to said orifice plate carrier by an interference fit between the outer circumference of said seal and the inner surface of the orifice plate carrier bore.

14. An apparatus for centering an orifice plate in an orifice fitting as recited in claim 1, wherein said sealing means comprises at least two tabs affixed to the orifice plate carrier on opposite sides of the orifice plate bore to secure a seal against said orifice plate carrier, said tabs having holes therethrough for receiving affixing means.

15. An apparatus for centering an orifice plate in an orifice fitting as recited in claim 14, wherein said affixing means comprises screws inserted through the holes in the tabs.

16. An apparatus for centering an orifice plate in an orifice fitting, comprising:
    (a) an orifice fitting body having a flow passage therethrough;
    (b) an orifice plate, removably located in the flow passage, having upstream and downstream sides and a bore therethrough;
    (c) an orifice plate carrier, having upstream and downstream sides and bottom and top portions, a seat for removably supporting and receiving said orifice plate, said seat defining a bore through said orifice plate carrier, wherein the bottom portion of the seat has at least one slot therethrough and wherein at least a portion of said orifice plate protrudes from the seat through the slot, and wherein said plate carrier further has at least two channels on its downstream side which extend from the bottom portion of said plate carrier to the slots;

(d) sealing means adjacent to said orifice plate for sealing the interface between said orifice plate and said orifice fitting body;

(e) a cradle having at least two locating surfaces which extend through the channels in said orifice plate carrier and contact portions of said orifice plate which protrude through the slots, wherein said locating surfaces are inclined at an angle from the bottom portion of said orifice plate carrier; and (f) contacting means for urging the top portion of said orifice plate carrier downward, thus urging said orifice plate downward so that portions of said orifice plate which protrude through the slots are urged against the locating surfaces of said cradle.

17. An apparatus for centering an orifice plate in an orifice fitting, as recited in claim 16, wherein said locating surfaces are concave.

18. An apparatus for centering an orifice plate in an orifice fitting as recited in claim 8, wherein said contacting means further comprises tabs formed on the bottom of said slide valve carrier.

19. An apparatus for centering an orifice plate in an orifice fitting as recited in claim 13, wherein said annular seal comprises an elastomeric material.

20. An apparatus for centering an orifice plate in an orifice fitting as recited in claim 13, wherein said annular seal comprises a fluoropolymeric material.

21. An apparatus for centering an orifice plate in an orifice fitting as recited in claim 13, wherein said annular seal comprises a metal ring encased by an elastomeric material.

22. An apparatus for centering an orifice plate in an orifice fitting as recited in claim 13, wherein said annular seal has grooves located on the outer and inner circumference of said annular seal for receiving metal O-rings.

* * * * *